United States Patent
Artzi et al.

(10) Patent No.: US 9,135,147 B2
(45) Date of Patent: Sep. 15, 2015

(54) AUTOMATED TESTING OF APPLICATIONS WITH SCRIPTING CODE

(75) Inventors: Shay Artzi, Brookline, MA (US); Julian Dolby, Bronx, NY (US); Salvatore A. Guarnieri, New York, NY (US); Simon H. Jensen, Aarhus V (DK); Marco Pistoia, Amawalk, NY (US); Manu Sridharan, Boulder, CO (US); Frank Tip, Ridgewood, NJ (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 13/457,083

(22) Filed: Apr. 26, 2012

(65) Prior Publication Data

US 2013/0290786 A1    Oct. 31, 2013

(51) Int. Cl.
*G06F 9/44* (2006.01)
*G06F 11/36* (2006.01)
*G06F 11/34* (2006.01)

(52) U.S. Cl.
CPC ........ *G06F 11/3676* (2013.01); *G06F 11/3684* (2013.01); *G06F 11/3688* (2013.01); *G06F 11/3466* (2013.01)

(58) Field of Classification Search
CPC .................... G06F 11/3668; G06F 11/3664
See application file for complete search history.

(56) References Cited

U.S. PATENT DOCUMENTS

| | | | | |
|---|---|---|---|---|
| 6,126,330 A * | 10/2000 | Knight | | 717/127 |
| 6,701,514 B1 * | 3/2004 | Haswell et al. | | 717/115 |
| 7,076,393 B2 | 7/2006 | Ormazabal et al. | | |
| 7,451,455 B1 * | 11/2008 | El-Haj | | 719/320 |
| 8,006,136 B2 | 8/2011 | Kube et al. | | |
| 2003/0028803 A1 | 2/2003 | Bunker et al. | | |
| 2003/0028856 A1 * | 2/2003 | Apuzzo et al. | | 717/124 |
| 2005/0160321 A1 * | 7/2005 | Cleaveland et al. | | 714/38 |
| 2005/0193269 A1 * | 9/2005 | Haswell et al. | | 714/38 |
| 2007/0037521 A1 * | 2/2007 | Babut et al. | | 455/67.11 |
| 2007/0168981 A1 * | 7/2007 | Pacheco et al. | | 717/124 |
| 2007/0240138 A1 | 10/2007 | Chess et al. | | |
| 2008/0109794 A1 * | 5/2008 | Adams et al. | | 717/130 |
| 2008/0127097 A1 * | 5/2008 | Zhao et al. | | 717/124 |
| 2009/0125976 A1 * | 5/2009 | Wassermann et al. | | 726/1 |
| 2009/0133033 A1 * | 5/2009 | Lindo et al. | | 718/108 |
| 2009/0199160 A1 * | 8/2009 | Vaitheeswaran et al. | | 717/124 |
| 2010/0242029 A1 * | 9/2010 | Tkachuk et al. | | 717/135 |
| 2011/0016356 A1 * | 1/2011 | Artzi et al. | | 714/38 |
| 2011/0030061 A1 | 2/2011 | Artzi et al. | | |

(Continued)

OTHER PUBLICATIONS

Marchetto et al., State-Based Testing of Ajax Web Applications, 2008, pp. 1-10.*

(Continued)

*Primary Examiner* — Lewis A Bullock, Jr.
*Assistant Examiner* — Tina Huynh
(74) *Attorney, Agent, or Firm* — Fleit Gibbons Gutman Bongini & Bianco PL; Jon A. Gibbons

(57) ABSTRACT

A novel system, computer program product, and method are disclosed for feedback-directed automated test generation for programs, such as JavaScript, in which execution is monitored to collect information that directs the test generator towards inputs that yield increased coverage. Several instantiations of the framework are implemented, corresponding to variations on feedback-directed random testing, in a tool called Artemis.

23 Claims, 9 Drawing Sheets

(56) References Cited

U.S. PATENT DOCUMENTS

| | | | |
|---|---|---|---|
| 2011/0047529 A1* | 2/2011 | Randimbivololona | 717/124 |
| 2012/0030516 A1* | 2/2012 | De Keukelaere et al. | 714/38.1 |

OTHER PUBLICATIONS

Nagarajan et al., Refactoring Using Event-based Profiling, 2003.*
Dallmeier et al., Webmate a Tool for Testing Web 2.0 Applications, 2012.*
Artzi, S., et al., "Practical fault localization for dynamic web applications," In Proc. 32nd Int. Conf. on Software Engineering, ICSE '10, May 2010.
Artzi, S., et al., "Finding bugs in dynamic web applications," in Proc. Int. Symp. on Software Testing and Analysis, ISSTA '08, Jul. 2008.
Boonstoppel, P., et al., "RWset: Attacking path explosion in constraint-based test generation," in Proc. 14th Int. Conf. on Tools and Algorithms for the Construction and Analysis of Systems, TACAS '08, Mar.-Apr. 2008.
Bryce, R. C., et al., "Test suite prioritization by interaction coverage," in Proc. Workshop on Domain Specific Approaches to Software Test Automation, DOSTA '07, Sep. 2007.
Duda, C., et al., "AJAX crawl: Making AJAX applications searchable," In Proc. 25th Int. Conf. on Data Engineering, ICDE '09, Mar.-Apr. 2009.
ECMA. ECMAScript Language Specification, 5.1. ECMA-262, Jun. 2011.
Godefroid, P. et al., "DART: Directed automated random testing." In Proc. ACM SIGPLAN Conf. on Programming Language Design and Implementation, PLDI '05, Jun. 2005.
Guarnieri, S., et al., Gatekeeper: Mostly static enforcement of security and reliability policies for JavaScript code. In Proc. 18th USENIX Security Symposium, Aug. 2009.
Heidegger, P. et al., "JSConTest: Contract-driven testing of JavaScript code," In Proc. 48th Int. Conf. on Objects, Components, Models and Patterns, TOOLS '10, LNCS. Springer-Verlag, Jun.-Jul. 2010.
Hsu, H., et al., "MINTS: A general framework and tool for supporting test-suite minimization," In Proc. 31st Int. Conf. on Software Engineering, ICSE '09, May 2009.
Jensen, S.H., et al., "Type analysis for JavaScript," In Proc. 16th Int. Static Analysis Symposium, SAS '09, vol. 5673 of LNCS. Springer-Verlag, Aug. 2009.
Le Hors, A., et al., "Document Object Model (DOM) level 3 core specification," Apr. 2004. W3C Recommendation. http://www.w3.org/TR/DOM-Level-3-Core.
Marchetto, A., et al., "Search-based testing of Ajax web applications," In Proc. 1st Int. Symp. on Search Based Software Engineering, SSBSE '09, May 2009.
Marchetto, A., et al., "State-based testing of Ajax web applications," In Proc. 1st Int. Conf. on Software Testing, Verification, and Validation, ICST '08, Apr. 2008.
Memon, A.M., "An event-flow model of GUI-based applications for testing," Software Testing, Verification & Reliability, 17(3):137-157, 2007.
Mesbah, A., et al., "Crawling AJAX by inferring user interface state changes," In Proc. 8th Int. Conf. on Web Engineering, ICWE '08, Jul. 2008.
Mesbah, A., et al., "Invariant-based automatic testing of AJAX user interfaces," In Proc. 31st Int. Conf. on Software Engineering, ICSE '09, May 2009.ript code. In Proc. 18th USENIX Security Symposium, Aug. 2009.
Pacheco, C., et al., "Feedback-directed random test generation," In Proc. 29th Int. Conf. on Software Engineering, ICSE '07, May 2007.
Richards, G., et al., "An analysis of the dynamic behavior of JavaScript programs," In Proc. ACM SIGPLAN Conf. on Programming Language Design and Implementation, PLDI '10, Jun. 2010.
Rothermel, G., et al., "Prioritizing test cases for regression testing," IEEE Trans. on Software Engineering, 27 (10):929-948, 2001.
Saxena, P., et al., "A symbolic execution framework for JavaScript," In Proc. 31st IEEE Symp. on Security and Privacy, S&P '10, May 2010.
Schepers, D., et al., "Document Object Model (DOM) level 3 events specification," Sep. 2009. W3C Working Draft. http://www.w3.org/TR/DOM-Level-3-Events/.
Sen, K., et al., "CUTE: a concolic unit testing engine for C," in Proc. 10th European Software Engineering Conf. held jointly with 13th ACM SIGSOFT Int. Symp. on Foundations of Software Engineering, ESEC/FSE '05, Sep. 2005.
Yuan, X., et al., "Generating event sequence-based test cases using GUI runtime state feedback," IEEE Trans. on Software Engineering, 36(1):81-95, 2010.
Yuan, X., et al., "Iterative execution-feedback model-directed GUI testing," Information & Software Technology, 52 (5):559-575, 2010.
Artzi, S., et al., "A Framework for Automated Testing of JavaScript Web Applications," ICSE'11 May 21-28, 2011, Honolulu, Hawaii, USA.
Guha, A., et al., "Using static analysis for Ajax intrusion detection," In Proc. 18th Int. Conf. on World Wide Web, WWW '09, Apr. 2009.

* cited by examiner

```
1  <html>
2  <head>
3  <link rel="stylesheet" type="text/css" href="style.css">
4  <script type="text/javascript" src="ajax.js"></script>
5  <script type="text/javascript">
6  var ajax = new AJAX();
7  var active = false;
8  var clicked = false;
9  var contentObj;
10 function mouseoverArticle() {
11   if (this==clicked) return;
12   if (active && active!=this) {
13     if (active==clicked)
14       active.className='selected';
15     else
16       active.className='';
17   }
18   this.className='over';
19   active = this;
20 }
21 function selectArticle() {
22   ajax.requestFile = this.id + '.html';
23   ajax.onCompletion =
24     function() {contentObj.innerHTML = ajax.response;};
25   ajax.run();
26   if (clicked && clicked!=this)
27     clicked.className='';
28   this.className='selected';
29   clicked = this;
30 }
31 function init() {
32   var articles =
33     document.getElementById('articles')
34       .getElementsByTagName('li');
35   for (var i=0; i<articles.length; i++) {
36     articles[i].onmouseover = mouseoverArticle;
37     articles[i].onclick = selectArticle;
38   }
39   contentObj = document.getElementById('content');
40 }
41 window.onload = init;
42 </script>
43 </head>
44 <body>
45 <div id="content">
46 <p>Click on one of the articles to the right.</p>
47 </div>
48 <div>
49 <ul id="articles">
50   <li id="article1">one</li>
51   <li id="article2">two</li>
52   <li id="article3">three</li>
53 </ul>
54 </div>
55 </body>
56 </html>
```

FIG. 1

1. procedure $main_{\mathcal{E},\mathcal{G},\mathcal{P}}$(URL $u_0$, State $S_0$):
2.    $Results := \emptyset$
3.    $Worklist := \emptyset$
4.    $VisitedStates := \emptyset$
5.    $add(u_0, S_0, \{[\text{type} = \text{"main"}], [], b_{init}\})$
6.    while $Worklist \neq \emptyset \land -timeout$ do
7.      $c = (u, S, s_1 \cdots s_n) = Worklist.removeNext()$
8.      // execute the sequence of events comprising test input $c$
9.      $\mathcal{E}.initialize(S)$
10.     $\mathcal{E}.load(u)$
11.     for $i = 1$ to $n$ do
12.       let $(p_i, f_i, b_i) = s_i$
13.       $\mathcal{E}.setFormFields(f_i)$
14.       $\mathcal{E}.setBrowserParameters(b_i)$
15.       $\mathcal{E}.triggerEvent(p_i)$
16.     end for
17.     $Results := Results \cup \{(c, \mathcal{E}.getMessages())\}$
18.     for each $c'$ in $Worklist$ do
19.       $Worklist.reprioritize(c'$ with priority $\mathcal{P}.priority(c'))$
20.     end for
21.     // make test inputs by modifying the last event in $s$
22.     for each $s'_n$ in $\mathcal{G}.generateVariants(s_n)$ do
23.       $add(u, S, s_1 \cdots s_{n-1} \cdot s'_n)$
24.     end for
25.     let $S = \mathcal{E}.getState()$
26.     if $S \notin VisitedStates$ then
27.       $VisitedStates.add(S)$
28.       if $\neg \mathcal{E}.hasFatalErrors() \land \neg \mathcal{E}.hasURLChanged()$ then
29.         // make test inputs by extending $s$ with a new event
30.         for each $p'$ in $\mathcal{E}.getEventRegistrations()$ do
31.           $add(u, S, s_1 \cdots s_n \cdot \mathcal{G}.generateNew(p'))$
32.         end for
33.       end if
34.       // make test inputs starting from other URLs
35.       for each $u_i$ in $\mathcal{E}.getURLs()$ do
36.         $add(u_i, S, \{[\text{type} = \text{"main"}], [], b_{init}\})$
37.       end for
38.     end if
39.    end while
40.    return $Results$
41.
42. procedure $add$(TestInput $c'$):
43.    $Worklist.add(c'$ with priority $\mathcal{P}.priority(c'))$ $\mathcal{E}.initialize(S)$: Sets the state of the browser and the web server according to $s$.

$\mathcal{E}.load(u)$: Loads the web page with the URL $u$ into the browser. This causes the HTML contents to be parsed into a DOM tree and JavaScript code fragments to be identified. No JavaScript code is executed yet, and additional dynamically generated JavaScript code may be identified later.

$\mathcal{E}.setFormFields(f)$: Fills out form fields (text fields, checkboxes, etc.) in the HTML DOM tree according to the form state map $f$. Form fields not covered by the map are unmodified.

$\mathcal{E}.setBrowserParameters(b)$: Sets the browser parameters as specified by the environment $b$.

$\mathcal{E}.triggerEvent(p)$: Creates an event from parameters $p$ and invokes the appropriate event handlers. During execution, it records information about runtime errors and other anomalies, code coverage, and registration and removal of event handlers.

$\mathcal{E}.getState()$: Returns the current state of the browser and server.

$\mathcal{E}.hasFatalErrors()$: Returns a boolean indicating whether the most recent invocation of $\mathcal{E}.triggerEvent$ lead to an uncaught JavaScript runtime exception.

$\mathcal{E}.hasURLChanged()$: Returns a boolean indicating whether the page URL was changed by the most recent invocation of $\mathcal{E}.triggerEvent$.

$\mathcal{E}.getMessages()$: Returns the set of errors/warnings encountered in the most recent event sequence execution.

$\mathcal{E}.getEventRegistrations()$: Returns a set of partially initialized event parameter maps corresponding to the event handlers that have been collected by $\mathcal{E}.triggerEvent$ since the last call to $\mathcal{E}.initialize$.

$\mathcal{G}.generateNew(r')$: Generates a new event, given a partially initialized event parameter map $p'$.

$\mathcal{G}.generateVariants(s_n)$: Generates a set of variants of the event $s_n$ by modifying the event parameter map, the form state map, or the environment.

$\mathcal{P}.priority(c')$: Computes a priority for the test input $c'$. This determines the order of exploration of the test inputs in the worklist. When computing the priority, $\mathcal{P}$ may consult all data gathered by $\mathcal{E}$.

$\mathcal{E}.getURLs()$: Returns the set of URLs pointing to other pages of the application (excluding frames), as collected by $\mathcal{E}$. This includes the URLs appearing in links in the DOM and direct modifications of $window.location$.

FIG. 2

|       | prioritization function | input generator |
|-------|-------------------------|-----------------|
| events | $P_0$                  | $G_0$           |
| const  | $P_0$                  | $G_1$           |
| cov    | $P_0 \times P_1$       | $G_1$           |
| all    | $P_0 \times P_1 \times P_2$ | $G_1$      |

FIG. 3

| benchmark | LOC | functions | coverage | | | | | errors | | |
|---|---|---|---|---|---|---|---|---|---|---|
| | | | initial | events | const | cov | all | initial | events | all |
| 3dModeller | 393 | 30 | 17 | 74 | 74 | 74 | 74 | 8/0 | 13/0 | 13/0 |
| AjaxPoll | 250 | 28 | 8 | 78 | 78 | 78 | 78 | 10/0 | 15/0 | 15/0 |
| AjaxTabsContent | 156 | 31 | 67 | 88 | 88 | 89 | 89 | 6/0 | 9/0 | 9/0 |
| BallPool | 256 | 18 | 55 | 89 | 89 | 90 | 90 | 7/0 | 7/0 | 7/0 |
| DragableBoxes | 697 | 66 | 44 | 61 | 61 | 62 | 62 | 13/0 | 14/0 | 14/0 |
| DynamicArticles | 156 | 27 | 35 | 82 | 82 | 75 | 82 | 6/0 | 8/0 | 8/0 |
| FractalViewer | 750 | 125 | 33 | 62 | 63 | 75 | 75 | 13/0 | 13/0 | 16/0 |
| Homeostasis | 2037 | 539 | 39 | 62 | 62 | 62 | 63 | 6/0 | 6/1 | 6/1 |
| HTMLEdit | 568 | 37 | 40 | 53 | 53 | 60 | 63 | 9/0 | 12/0 | 12/0 |
| Pacman | 1857 | 152 | 42 | 44 | 44 | 44 | 44 | 8/0 | 17/0 | 17/0 |
| AVERAGE | | | 38 | 69 | 69 | 71 | 72 | | | |

FIG. 5

AUTOMATED TESTING OF APPLICATIONS WITH SCRIPTING CODE

BACKGROUND

The present invention generally relates to testing applications for risk management and security, and more particularly to testing applications with dynamic pages.

Dynamic program analysis is the analysis of computer software that is performed by executing programs built from that software system on a real or virtual processor. For dynamic program analysis to be effective, the target program must be executed with sufficient test inputs to produce interesting behavior JavaScript is rapidly gaining in popularity because it enables programmers to write rich web applications with full-featured user interfaces and portability across desktop and mobile platforms. Recently, pointer analysis for JavaScript has been used to enable applications such as finding security vulnerabilities [10, 11], bug finding [13], and automated refactoring [8]. However, the presence of several hard-to-analyze language features in JavaScript and other scripting languages has a detrimental impact on the scalability and precision of traditional points-to analysis algorithms such as Andersen's analysis, making the applications of such algorithms impractical for those languages. Thus, there is need for techniques that make pointer analysis for languages such as JavaScript practical.

BRIEF SUMMARY

Current practice in testing JavaScript web applications requires manual construction of test cases, which is difficult and tedious. Presented is a framework for feedback-directed automated test generation for JavaScript in which execution is monitored to collect information that directs the test generator towards inputs that yield increased coverage. Several instantiations of the framework are implemented, corresponding to variations on feedback-directed random testing, in a tool called Artemis. Experiments on a suite of JavaScript applications demonstrate that a simple instantiation of the framework that uses event handler registrations as feedback information produces surprisingly good coverage if enough tests are generated. By also using coverage information and read-write sets as feedback information, a slightly better level of coverage can be achieved, and sometimes with many fewer tests. The generated tests can be used for detecting HTML validity problems and other programming errors. The invention has application to AJAX, Automated testing, Debugging, Event driven, JavaScript, Random testing, and Web applications.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 1 is an example JavaScript Program in an HTML page;

FIG. 2 is pseudo-code for the main algorithm, along with a description of auxiliary operations that is uses;

FIG. 3 is a table (Table I) of test generation algorithms;

FIG. 5 is a table (Table II) of benchmark characterizing and summary of experimental results;

DETAILED DESCRIPTION

1. Introduction

Figure 4:
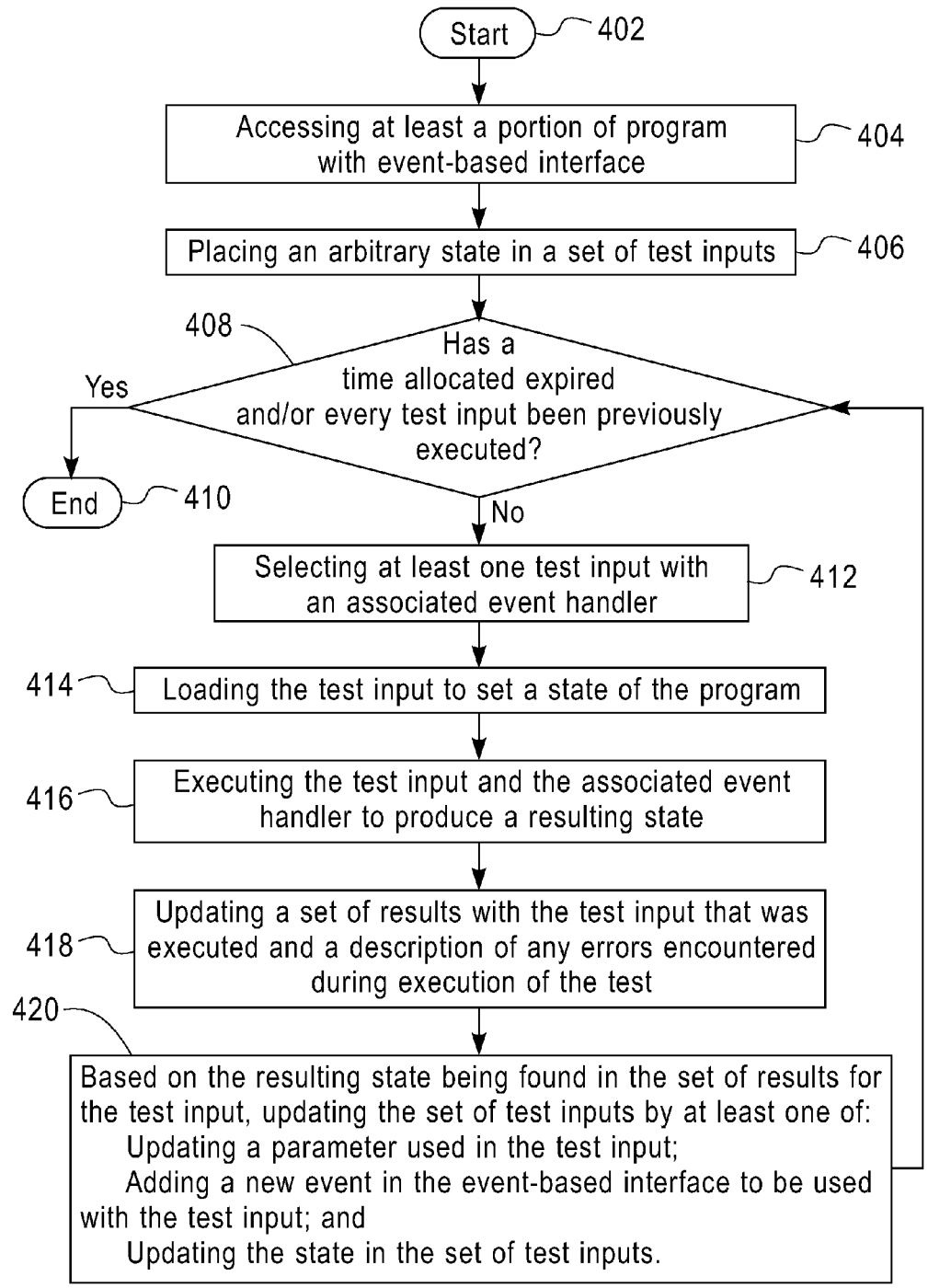
FIG. 4 is a high level flow diagram of automated testing of programs

JavaScript [6, 13] plays a central role in modern web applications. Although originally designed for simple scripting, modern JavaScript programs are complex pieces of software that involve intricate communication with users and servers. Compared to languages such as Java and C#, relatively little tool support is available to assist JavaScript programmers with testing their applications. In current practice, JavaScript programmers construct test cases either manually or using unit testing tools with capture-replay facilities such as Selenium, Watir, and Sahi. These tools provide functionality for recording the GUI actions performed by a user in test scripts, for running a suite of tests, and for visualizing test results. However, even with such tool support, testing remains a challenging and time-consuming activity because each test case must be constructed manually. Obtaining reasonable coverage of an application may be difficult because of JavaScript's event-driven style, which often gives rise to a combinatorial explosion in the number of possible executions, and because of JavaScript's extremely dynamic nature [20], which makes it difficult for users to understand how to write test cases that exercise a particular feature of an application.

This patent is based on a paper [27]. The goal of our research is to develop scalable and effective algorithms for automated testing of JavaScript applications to discover common programming errors of various kinds, including uncaught exceptions (e.g., runtime errors resulting from the use of undefined in a dereference or a function call), unusual type coercions or misuses of the browser's built-in libraries, invalid HTML, AJAX HTTP errors, and violation of assertions. A prerequisite for discovering such errors is that the generated tests obtain high code coverage, which we focus on in this paper. We envision automated testing used as part of the development process of future JavaScript applications to improve code quality and reduce development time.

Several previous research projects have explored automated testing of JavaScript applications. The Crawljax/Atusa project [17,18] uses dynamic analysis to construct a model of an application's state space, from which a set of test cases is generated. This work relies on a heuristic approach for detecting active user-interface components, and crawls these in some random order. A limitation of this heuristic approach is that it may be unable to detect all relevant event handlers (as is evidenced by the fact that the tool provides users with a domain-specific language to specify how to crawl an application). The Kudzu project [22] combines the use of random test generation to explore an application's event space (i.e., the possible sequences of user-interface actions) with the use of symbolic execution for systematically exploring an application's value space (i.e., how the execution of control flow paths depends on input values). Kudzu relies on an elaborate model for reasoning about string values and string operations, which are frequently manipulated by JavaScript applications.

However, it remains to be determined if high code coverage can perhaps be achieved with simpler techniques, without requiring a sophisticated string constraint solver.

The present invention in one example provides a new framework for automated testing of JavaScript web applications. The framework takes into account the idiosyncrasies of JavaScript, such as its event-driven execution model and interaction with the Document Object Model (DOM) of web pages. The framework is parameterized by: (i) an execution unit to model the browser and server, (ii) an input generator to produce new input sequences, and (iii) a prioritizes to guide the exploration of the application's state space. By instantiating these parameters appropriately, various forms of feedback-directed random testing (e.g., in the spirit of Randoop [19]) can be performed. Here, the idea is that when a test input has been generated, the system executes the application on that input and observes the effects, which can then be used to guide the generation of additional test inputs.

This framework is implemented in a tool called Artemis, and created several feedback-directed random test generation algorithms by instantiating the framework with different prioritization functions and input generators. Artemis is the twin sister of Apollo [2], a tool for automated testing of PHP applications.

The present invention provides:
A flexible framework for automated feedbackdirected test generation for JavaScript web applications.
By instantiating the framework with different prioritization functions and input generators several practical test generation algorithms are obtained: events monitors the execution to collect relevant event handlers, const additionally collects constants, cov also considers coverage, and all additionally takes reads and writes of variables and object properties into account.
An evaluation on a suite of JavaScript applications shows that, surprisingly, even the simple events algorithm achieves 69% coverage on average when 100 tests are generated, which significantly exceeds the 38% coverage obtained by only loading each application's main page. Furthermore, with the extended use of feedback information in the const, cov, and all algorithms a slightly higher level of coverage (up to 72%) can be reached, and sometimes with many fewer tests. HTML validity errors and execution crashes detected are reported by the automatically generated tests.

The remainder of this patent is organized as follows. First, a motivating example in is presented in Section 2. Then, Section 3 presents the framework, and Section 4 describes several algorithms that were obtained by instantiating the framework with suitable prioritization functions and input generators. Section 5 presents our tool, Artemis, and its evaluation on a range of JavaScript applications. Section 6 discusses related work on automated testing. Finally, Section 7 concludes and mentions ideas for future work.

2. Motivating Example

The JavaScript application shown in FIG. 1 is a simplified version of an example from online URL (www.dhtmlgoodies.com) that demonstrates dynamic loading of contents using AJAX.

It first registers an event handler for the load event (line 41). That event handler (lines 31-40) in turn registers event handlers for mouseover and click events for each li element appearing in the element with ID articles. The mouseover events occur when the user hovers the mouse over the elements, causing the className to be modified and thereby changing the CSS properties (lines 10-20). The click events occur when the user clicks on the elements, which causes the contents of the element with ID content to be replaced by the appropriate article being selected (lines 21-30). To save space he associated CSS stylesheet and the file ajax.js are omitted that contains basic AJAX functionality.

This simple example shows how triggering relevant events can be crucial for exercising JavaScript applications. Lines 31-41 are executed just by loading the page, without triggering any actual events. One way to cover more code is to subsequently trigger a click event on one of the li elements. That will execute lines 21-30, except line 27, which requires yet another click event to be triggered on another li element. Also note that line 24 is not executed directly but only via an AJAX response event that is made possible by the call to the AJAX library on line 25. Obtaining full coverage of lines 10-20 requires several additional events, in this case of type mouse over, to be triggered at the right nodes.

Simply triggering sequences of events produces an intractable number of possible executions, and our tool relies on prioritization functions to decide what sequences will yield the best tests. The code of FIG. 1 illustrates two such metrics that will be defined precisely later. First, observe that mouseoverArticle reads the local variable clicked and selectArticle writes that local variable. Hence, it seems plausible that after triggering selectArticle, the system should next try mouseoverArticle again to see if anything different happens. In Section 4.1, a prioritization function is introduced that considers such information about Read/Write Sets to identify sequences of events that are likely to increase coverage. Second, note that mouseoverArticle has several conditionals, and hence will likely need to be executed multiple times to cover all the code. In general, calling a function is more likely to increase coverage as it contains more conditional cases that have not been executed yet. This is addressed in Section 4.1 by a prioritization function that considers Coverage to direct test generation.

3. The Framework

When a browser loads a web page, it parses the HTML contents into a DOM structure and executes the top-level JavaScript code. This may involve registration of event handlers that may be triggered later and cause more code to be executed. Event handlers are executed one at a time in a single-threaded fashion. Our framework is tightly connected to this execution model.

3.1 Input Structure

Compared to automated test generation for other languages, such as C [24] or PHP [2], the input to a JavaScript application has an unusual structure. Each event is a simple record for which all possible parameter values are valid (i.e., there are no application specific invariants that must be satisfied). On the other hand, highly nondeterministic sequencing of events must be addressed. The following definitions characterize the notion of a test input to a JavaScript application accordingly.

DEFINITION 1. An event consists of: (i) an event parameter map, which is a finite, partial map from strings (parameter names) to numbers, booleans, strings, and DOM nodes, (ii) a form state map, which provides string values for HTML form fields, and (iii) an environment, which holds values for the current time of day, the size of the screen, and various other constituents of the browser's state that, to some extent, can be controlled by the user.

DEFINITION 2. A test input consists of (i) a URL to a web page, (ii) an entry state that describes the state of the server (e.g., databases and session data) and the local browser (e.g., cookies), and (iii) a sequence of events (according to Definition 1).

Among the parameters in event parameter maps are the type parameter describing the kind of event, and, in case of a UI event, the target parameter referring to the node where the event occurs. References to DOM nodes in test inputs are expressed as access paths from the global object (window) to the node objects, for example window.document.childNodes[1].childNodes[Ø]. Our notion of events encompasses not only activities performed by the user, but also timer events and AJAX callbacks.

3.2 Execution Model

Some web applications consist of a single web page that is modified dynamically by the JavaScript code as the user interacts with it. Other applications are divided into multiple pages that link to each other, either explicitly with HTML <a href=" . . . "> tags or implicitly by JavaScript code that modifies window.location. Our approach discovers such URLs to other pages during the execution and uses them to create new test inputs.

JavaScript applications may also involve multiple interconnected windows and frames shown simultaneously within the same browser. Our algorithm starts with the URL for the main window. When the algorithm executes test inputs for that URL, other windows and frames may be created in the process, and the execution unit manages all of them as a single, combined JavaScript DOM structure.

Because of the event capturing and bubbling mechanisms in JavaScript [23], a single user event may result in multiple event handlers being executed, and the events may be triggered at different nodes than where event handlers have been registered. All execution is monitored to collect, in particular, registration and removal of event handlers. This results in the construction of partially initialized event parameter maps that contain the event type (as the parameter named type) and the node where the event handler is registered (the parameter currentTarget). The remaining constituents of the event parameter maps that are controlled by the user and not by the program (for example, the target property) are filled in later.

3.3 Algorithm

FIG. 2 shows pseudo-code for our main algorithm, along with a summary of key operations performed by the algorithm. It takes as input a URL $\mu_o$ of the initial web page to be tested and an entry state $S_o$. The algorithm is parameterized by: (i) an execution unit $\epsilon$ that models the browser and the server, (ii) a test input generator G that can produce new event sequences, and (iii) a prioritizer $\rho$ that guides the exploration. $\epsilon$, G, and $\rho$ are described later. In Section 4 several instantiations of the framework are presented that correspond to variations on random testing.

The algorithm (FIG. 2) maintains a set Results of test inputs and error messages that have been generated, a set VisitedStates of states that have been visited, and a priority queue Worklist containing test inputs that have been generated but not yet executed. Initialization of these data structures takes place on lines 2-4.

The algorithm starts by creating an initial test input on line 5, which is added to the worklist with an appropriate priority using an auxiliary procedure add (lines 42-43). This initial test input consists of the URL $\mu_o$ of the initial web page, the entry state $S_o$, and the singleton sequence ([type="main"]; [ ]; $b_{init}$). Here, main is a pseudo-event type denoting the JavaScript code that constructs the HTML DOM structure and executes the top-level script code, followed by the onload event handler (and related handlers, such as DOMContentLoaded). The initial form state map is empty, denoted [ ], and the browser environment is set to an initial, arbitrary state $b_{init}$.

The algorithm then enters an iterative phase (lines 6-39) that continues until the worklist is empty or the allotted time is spent. The execution of each test input from the worklist starts by setting the state of the browser and the web server (line 9) and loading the test input URL (line 10). The execution of the event sequence is then performed by $\epsilon$ (lines 11-16).

On line 17, a pair <c,$\epsilon$.get.Messages( )> is added to Results containing the test input that was used in the current execution and a description of any execution errors that were encountered during that execution. This may involve, for example, checking that the current page DOM consists of valid HTML. The loop on lines 18-20 recomputes the priorities for all entries in the worklist. The priorities may have changed as a result of new information that was collected during the previous execution.

If the resulting state has not already been visited (line 26), new test inputs are generated in three ways: (i) by modifying the last event in the current test input (producing an event sequence of the same length, but with different parameters), as shown on line 22, (ii) by extending the current test input with a new event (producing a longer event sequence), as shown on line 31, and (iii) by starting from a different page URL, as shown on line 36.

On line 31, G.generateNew($\rho'$) creates an event from the given partially initialized event parameter map p0 that was created by the call to G.getEventRegistrations( ), based on the current state of the execution unit. On line 22, the call G.generateVariants($s_n$) may modify the event parameter map of $s_n$ (for example, corresponding to the situation where the user presses a different keyboard button), the form state map (if the user changes a form field), and the environment (when the time has changed). The generation and modification of events may be done randomly or using knowledge obtained during previous executions.

The functions $\epsilon$.hasFatalErrors( ) and $\epsilon$.hasURLChanged( ) are used on line 28 to prevent the extension of event sequences that lead to runtime errors or change the page URL. The operation $\epsilon$.getURLs( ) returns a set of URLs collected during the execution, which are used to explore other pages of the application.

Finally, on line 40 the algorithm returns the computed set of pairs of test inputs and error messages.

The algorithm can in principle generate all possible test inputs and exercise all parts of the JavaScript application that are reachable by a single user, relative to the entry state. (The generalization to multiple users are addressed in future work.) In practice, as described in Section 5, the success of the algorithm depends on the specific choices made for $\epsilon$, G, and $\rho$, which determine to what extent the algorithm is capable of producing "interesting" sequences of events that yield high coverage.

4. Feedback-Directed

Random Testing

This section shows how the framework of Section 3 can be instantiated with a suitable execution unit how $\epsilon$, prioritizer $\rho$, and input generator G to obtain concrete test generation algorithms. Specifying an execution unit $\epsilon$ requires description of: (i) what execution information is recorded by $\epsilon$.triggerEvent (e.g., information about coverage and registered event handlers), and (ii) which kinds of runtime errors are detected by $\epsilon$.triggerEvent and $\epsilon$.checkState. Other aspects of the execution unit will be discussed in Section 5.1.

The heuristics presented in this section are feedback-directed in the sense that the generation of new test inputs is guided by information gathered during executions of the application on previously generated test inputs.

4.1 Prioritization Functions $\rho$.priority(c) is defined for a test input c=(u, S, $s_1 \ldots s_n$) as the product of prioritization functions for particular heuristics, as defined below. The weighting between the various heuristics and the constants involved can be adjusted, of course, but the simple approach taken here already appears to be quite effective in practice, as discussed in Section 5. Also, let $e_i$ denote the set of event handlers (i.e., JavaScript functions) that are executed when the i'th event is triggered during the execution of c.

Default Strategy

Begin by defining a naive prioritization function that assigns the same priority to all sequences of events:

$$P_0(c)=1$$

In this strategy, the execution unit $\epsilon$ keeps track of event handlers as they are registered, unregistered, and executed. When the algorithm discovers a new possible sequence of events on lines 31 and 22 of FIG. 2, these are added to the worklist with the same priority, 1. Then, since all worklist items have equal priority, the call to removeNext on line 7 will randomly select an item, thus ensuring that each has the same chance of being selected.

Coverage

Intuitively, executing sequences of event handlers for which we already have nearly 100% code coverage is likely to be less fruitful than executing sequences of events for which coverage is low. To take this into account, a prioritization function is defined that prefers sequences with relatively low branch coverage in their constituent events.

To this end, the execution unit $\epsilon$ is extended to keep track of the set of branch points in each event handler. Here, a branch point is either the entry of an event handler, or a location in the source code from where control flow can proceed to two or more locations, based on some condition. A branch of a branch point is covered when it has been executed. For a set of event handlers e, cov(e) is used to denote the number of covered branches in e divided by the total number of branches that have been discovered so far in e. Both these numbers may increase when more branch points are discovered to be reachable in executions of e. A prioritization function can now be defined as follows:

$$P_1(c)=1-\text{cov}(e_1)\times \ldots \times \text{cov}(e_n)$$

Note that all sets defined in this section, like cov(e), do not only contain information for the given event handlers, but also for all functions transitively invoked by the handlers.

Read/Write Sets

Sometimes, code in an event handler can only be covered if a property is set to an appropriate value by a previously executed event handler. To account for this, the priority of a sequence of events $s_1 \ldots s_n$ is defined to be proportional to the number of properties that are known to be read by $s_n$ and that are also known to be written during the execution of at least one of $s_1 \ldots s_{n-1}$. To this end, the execution unit $\epsilon$ is extended so that, for each event handler set e, it keeps track of sets read(e) and written(e) of names of variables and properties that were observed to be read and written, respectively, during executions of event handlers from e. We can now define the prioritization function as follows:

$$P_2(c) = \frac{|(\text{written}(e_1) \cup \ldots \cup \text{written}(e_{n-1}) \cap \text{read}(e_n)| +1}{|\text{read}(e_n)| +1}$$

To simplify the implementation, only the name of the variable or property accessed is stored. While this opens up the possibility of sets containing the same string while actually referring to different variables or properties, this has not posed a problem in our experiments.

The term "+1" in the numerator and denominator is introduced to avoid divisions by zero in case no reads or writes have been observed in event handlers.

Other Prioritization Functions

We also experimented with prioritization functions that assigned lower or higher priorities depending on the length of the sequence of events s, and depending on the number of variants of s (same sequence of events, but with different parameter values) that executed previously. As the results obtained with these heuristics were inconclusive, we will not discuss them in detail.

4.2 Input Generators

Discussed now are two alternative implementations of the input generator G.

Default Strategy

Generating new events is done by G.generateNew on line 31. This involves completing the event parameter map and giving values to all form fields. The default input generation strategy, named $G_0$, chooses a reasonable default value for event parameters. For instance, 0 is the default value for the button parameter of a new mouse click event, meaning that the left button was clicked. For simplicity, the currentTarget parameter is always set equal to target in the basic strategy, meaning that events are triggered at the same nodes where the event handlers are registered (see the discussion of capturing/bubbling in Section 3.2). Form fields are set to the empty string for string inputs, and unselected for selection elements.

Variants of an already executed event are created by G.generate-Variants on line 22. In the default strategy, randomly chosen values are used for both event parameters and form fields. The random generator used a seed with values taken from a global set of constants harvested from the program source. A single new variant is produced in each invocation.

Dynamically Collected Constants

In the advanced input generation strategy, named $G_1$, the execution unit $\epsilon$ is extended to track constants. For each set of event handlers e, the execution unit maintains a set const(e) which contains all constants encountered while executing $\epsilon$. In this strategy, G.generateVariants makes use of these dynamically collected constants to complete event parameter maps. When generating a variant of an event sequence $s_1 \ldots s_n$ values for form fields and event parameters from the set const($e_n$) are chosen. This makes the choice of constants more targeted compared to the basic strategy as only constants actually observed during executing are used, and because a separate set of constants is used for each event handler.

4.3 Algorithms

Four feedback-directed test generation algorithms are considered. For convenience these are named events, const, cov, and all. These algorithms are constructed by instantiating the framework of Section 3 with the prioritization functions and input generators presented above, as indicated in Table 1 as shown in FIG. 3. Table I: Test generation algorithms. The prioritization functions and input generations are the one defined in Section 4.1 and 4.2, respectively. Similar to previous work [22], the amount of code loaded by the initial page (triggering only the main pseudo-event) is used as a baseline for comparison and use initial to refer to this "algorithm".

For the example from FIG. 1 the algorithm detects all event handlers during the first iteration. Using the all algorithm, 96% coverage is obtained after 11 iterations, when only line 14 remains uncovered. This particular line requires a subtle combination of click and mouseover events, which is found after additional 17 iterations, resulting in 100% coverage after a total of 3 seconds of execution. In comparison, the simpler algorithm events obtains full coverage typically after around 35 iterations, and initial obtains only 40% coverage.

Since the framework randomly selects work list entries among those with the highest priority, the exact iteration numbers here vary slightly when running the tool.

High-Level Flow

FIG. 4 is a high level flow diagram of automated testing of programs. The process begins in step 402 and immediately proceeds to step 404 in which at least a portion of a program with an event-based interface is accessed. Next, in step 406, an arbitrary state in a set of test inputs is placed.

In one example, the program is a web page for execution in a browser, and the arbitrary state is a starting web page. In another example the arbitrary state is prioritized based on a document object model associated with the starting web page. In yet, another example program is the web page including a portion written with a scripting language, such as JavaScript.

A loop is entered in step 408. The loop continues until: i) a testing time allocated has expired, and/or ii) every test input in the set of test inputs has been executed. If the time allocated is expired and/or all the tests have been executed, the automated testing ends in step 410. Otherwise, steps 412-420 are carried out. In step 412, a test input is selected with an associated event handler.

In one example, the test inputs are reprioritized based on the set of branch points using a prioritized function. In another example, the test inputs are reprioritized based a prioritization function. In yet, another example, the test inputs are reprioritized based a program state read and written by the associated event handler. Examples of the different prioritization methodologies are described in Section 4.1.

In step 414 the test input is loaded to set a state of the program. The test input and the associated event handler to produce a resulting state is executed in step 416. A set of results with the test input that was executed and a description of any errors encountered during execution of the test input is updated in step 418. In step 420, based on the resulting state being found in the set of results for the test input, updating the set of test inputs by at least one of: i) updating a parameter used in the test input; ii) adding a new event in the event-based interface to be used with the test input; and iii) updating the state in the set of test inputs. The process then loops back to step 408. In one example, the set of results includes one or more web pages. In another example a static analysis is applied to those web pages to find security vulnerabilities, which are then reported to the user.

In one example in step 420, the updating a set of results with the test input that was executed and a description of any errors encountered during execution of the test input. In another example a set of branch points is created corresponding to the associate event handler, wherein each branch point is at least one of an entry to the associated event handler and a location in the program from which control flows in response to actions initiated outside the programs, and in response to the branch point being found in the set of branch points for the test input reducing a priority the test input in the set of test inputs.

5. Implementation and Evaluation

This section presents our implementation and an evaluation of the events, const, cov, and all algorithms, as defined in Section 4.3.

5.1 Implementation

The framework and algorithms are implemented in a tool called Artemis, based on a modified version of the Rhino JavaScript interpreter that records information about event handlers, coverage information, constants and read/write sets. (http://www.mozilla.org/rhino for more information.)

The Envjs library5 is used for modeling the browser environment, which enables us to bypass all visual rendering and simulate event delays without actual delays during execution. (http://www.envjs.com for more information.) Artemis keeps track of an application's browser state (cookies) and server state, so that these can be reset before executing the application on a new input. Artemis server state resetting is presently restricted to PHP session state (while using the Apache web server) and database state.

A few key implementation details are commented as follows: (i) the check on line 26 relies on hashing to efficiently compare states; this check is approximate (e.g., in one example the concrete values of CSS properties are ignored) but it is unlikely that this affects coverage significantly, (ii) for server-based applications, initial server state (including a populated database, if needed) must be provided by the user, (iii) Artemis simulates a consistent temporal ordering between events, and inserts some random (simulated) delays to trigger time-dependent behaviors.

With respect to programming errors, Artemis currently detects several types of runtime errors when $\epsilon$.triggerEvent is invoked, including dereferencing null and undefined, and invoking values that are not functions. Invalid HTML is detected when $\epsilon$.getMessages is called. In other words, HTML is checked after each event handler has completed, not during execution when the page is allowed to be temporarily invalid.

5.2 Research Questions

Our primary objective is achieving good code coverage. In addition, detecting programming errors such as invalid HTML and runtime errors is another objective. In the remainder of this section, the following research questions are answered:

Does the events feedback-directed algorithm achieve significantly better coverage than initial? If so, then the feedback-directed framework itself with just the default instantiation is useful.

What level of code coverage is achieved by each of the test generation algorithms under consideration, when each is allowed to generate the same number of tests?

How quickly does each of the feedback-directed algorithms converge on the maximal coverage that it will achieve?

How many HTML validity errors and runtime errors are detected by the different algorithms?

5.3 Experimental Methodology

Measuring code coverage of JavaScript applications is challenging for several reasons: (i) JavaScript code in the wild is often compacted, which in particular removes line breaks, making line coverage meaningless, (ii) code can be dynamically generated within the browser, either explicitly using, e.g., eval, or implicitly by dynamic construction of, e.g., script tags, and (iii) code can be generated dynamically on the server, for example by PHP or Java code. Thus, it is not obvious how to associate meaningful source location information with individual code fragments. This is problematic as computing a coverage percentage requires us to determine how many lines have been executed relative to the total number of executable source lines.

Other work on automated testing for JavaScript is not very explicit about how coverage is measured [18, 22], which makes direct comparisons difficult. The measurements are performed as follows: (i) use an original, non-compacted code where available and pretty-print the code otherwise before testing6, (ii) JavaScript code that is dynamically generated within the browser is simply disregarded from the measurements. (http://jsbeautifier.org for more information.)

This has little effect on our benchmarks (see Section 5) where the amount of executed dynamically generated code never exceeds one JavaScript statement, (iii) rely on the user to specify the URLs of all the .html and .js files that contain the application's JavaScript code. Known libraries, such as jQuery, are always excluded. The execution unit can then measure which lines in which files have been executed by the tests to calculate line and branch coverage. Note that the purpose of step (iii) above is only to ensure a well-defined measure of total coverage by including all code that could possibly be reached. While the cov and all algorithms uses coverage information to guide test generation, they only use such information about already executed code. If the user is not interested in total coverage but only in producing the test inputs, step (iii) can be skipped.

The user is assumed to have full control over the application being also to be able to restore the server state in $\epsilon$.load. In contrast, previous approaches (e.g., [22]) ignore JavaScript files that are not reached during the exploration, and are run against a live server, without resetting the server state between executions, thereby making their results difficult to reproduce and compare. One drawback to our approach is that it requires access to the entire application, including any server-side code, which may be unavailable, or which may require significant effort to install. Thus, Artemis cannot be applied to, e.g., FaceBook Chat since the entire application source code is not available to us. Moreover, the usage terms of FaceBook and most other commercial applications prohibit automated access.

5.4 Benchmarks

Table 2 shows the subject JavaScript programs on which the test generation algorithms are evaluated. All of these programs are publicly available and represent a variety of different types of JavaScript programs that uses the DOM API to manipulate the page. All the programs are interactive and event-driven in nature. The benchmarks include programs (3dModeller, FractalViewer) that use newer HTML5 features such as the canvas element, and AjaxPoll has a server side component written in PHP. All benchmarks and results and the complete example from Section 2 are available at online URL (http://www.brics.dk/artemis) Table 2: Benchmark characteristics and summary of experimental results. For each subject program, the columns of the table show, from left to right: the number of executable lines of code (LOC), the number of functions, the coverage achieved by the initial algorithm, the coverage achieved by the events, const, cov, and all algorithms after generating 100 tests, and the number of HTML errors/execution errors observed for the initial, events, all algorithms after generating 100 tests.

5.5 Coverage

Table 2 also shows, for each benchmark, the percentage of executable lines of code covered by the initial algorithm, and the percentage of code covered by each of the events, const, cov, and all algorithms after generating 100 tests. Two conclusions are immediately obvious:

On average, the initial algorithm achieves 38% coverage, which is significantly less than the average coverage achieved by events (69%), const (69%), cov (71%), and all (72%).

The coverage percentages achieved after 100 generated tests are remarkably similar for the events, const, cov, and all algorithms, with the difference exceeding 1% in only three cases: On DynamicArticles, cov achieves 75% vs. 82% for the other three algorithms, on FractalViewer, cov and all achieve 75% coverage vs. 63% for events and const, and on HTMLEdit, all achieves 63% coverage, which is significantly better than the 53% reached by events and const.

While Table 2 in FIG. 5 shows that the four feedback-directed algorithms achieve nearly identical coverage after 100 generated tests in most cases, the question remains how the algorithms fare when fewer each of the benchmarks and for each of these algorithms, the coverage achieved as a function of the number of generated tests. From these charts, it is clear that cov and all sometimes achieve their maximal coverage with many fewer tests than events and const. For example, on 3dModeller, all four algorithms achieve the same maximal coverage of 74%, but all requires only 15 tests to reach this level, whereas cov requires 45 tests, const requires 80 tests, and events even 85 tests. Similar effects can be observed on several other benchmarks. On the other hand, for some other benchmarks (e.g., Pacman, DragableBoxes) the behavior of the four algorithms is very similar. The Pacman benchmark is a bit of an outlier with only 44% coverage reached by all algorithms. This is due to the fact that Pacman is an interactive game that involves behaviors that are only triggered by complex sequences of user events and timeouts.

5.6 Programming Errors

Turing now to FIG. 5, the last three columns of Table 2 show the number of HTML errors and execution errors that were observed in each benchmark, for the initial algorithm, and for events and all after 100 generated tests. As can be seen from these results, HTML errors were observed in all benchmarks, but only one execution error was found (a dereference of undefined, in Homeostasis). The benchmark programs have likely already been thoroughly tested, significant errors were not suspected to be found, and most of the HTML errors are indeed relatively harmless. Specific examples of the kinds of HTML errors found include misplaced body, li, and div elements as well as attributes that are browser specific or otherwise illegal according to the chosen DOCTYPE.

In several cases, events and all find significantly more HTML errors than initial. Interestingly, this is even the case for Pacman, where twice as many HTML errors are found despite the fact that these algorithms achieve only 1% more coverage than initial. Note also that the sole execution error was not found by initial, reaffirming that it is worthwhile to test parts of an application beyond what can be reached after the initial page load.

5.7 Performance

The algorithms presented in this patent are quite efficient. On each of our benchmarks, generating 100 test inputs with any of the algorithms under consideration required at most 2 minutes. All experiments reported on in this paper were conducted on a PC with a 3.2 Ghz CPU and 2 GB of memory, running Linux.

5.8 Summary

Figure 6A:
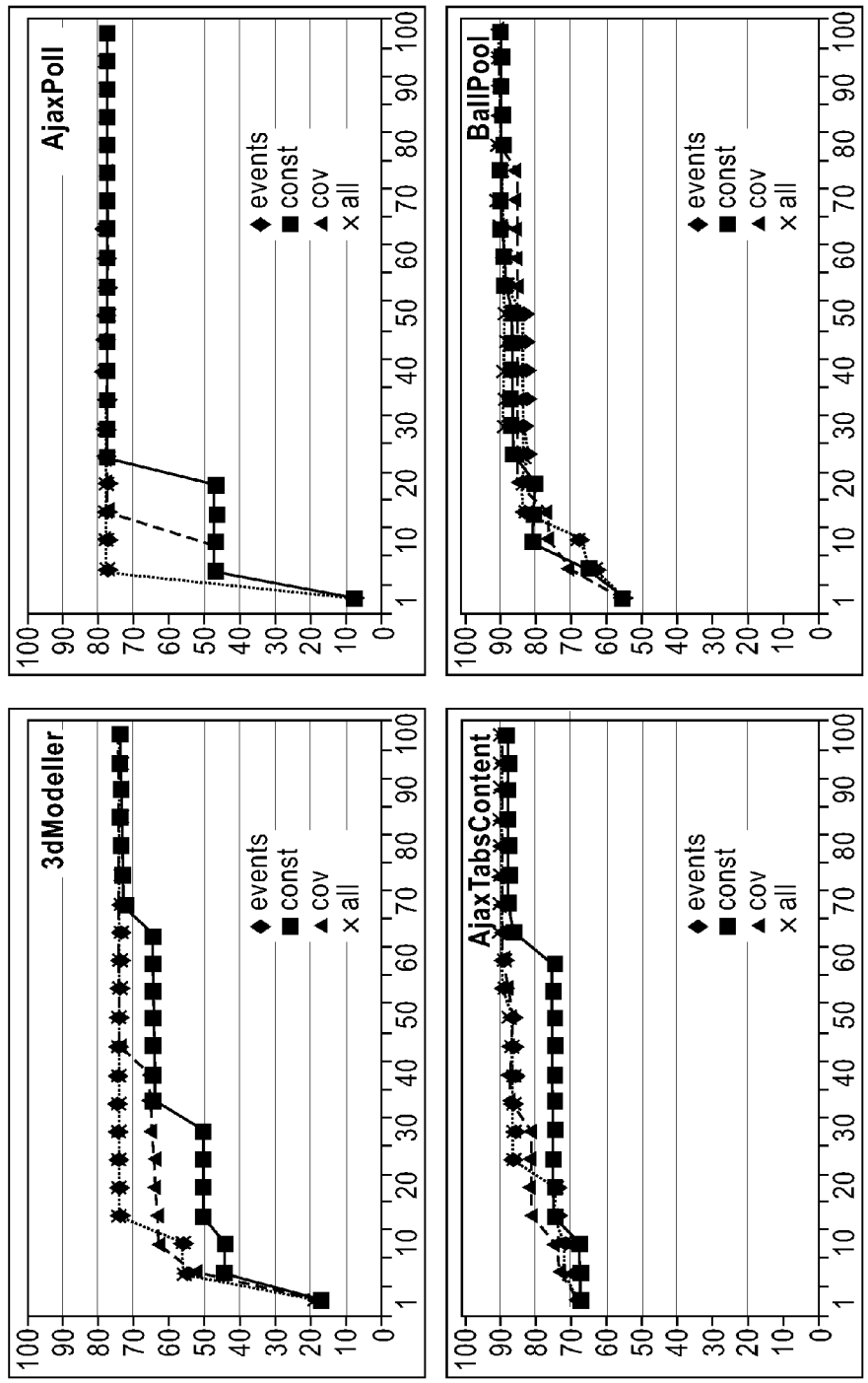
FIG. 6 are a series of graphs of coverage computed for each of the benchmarks, as a function of the number of generated tests.
Figure 6B:
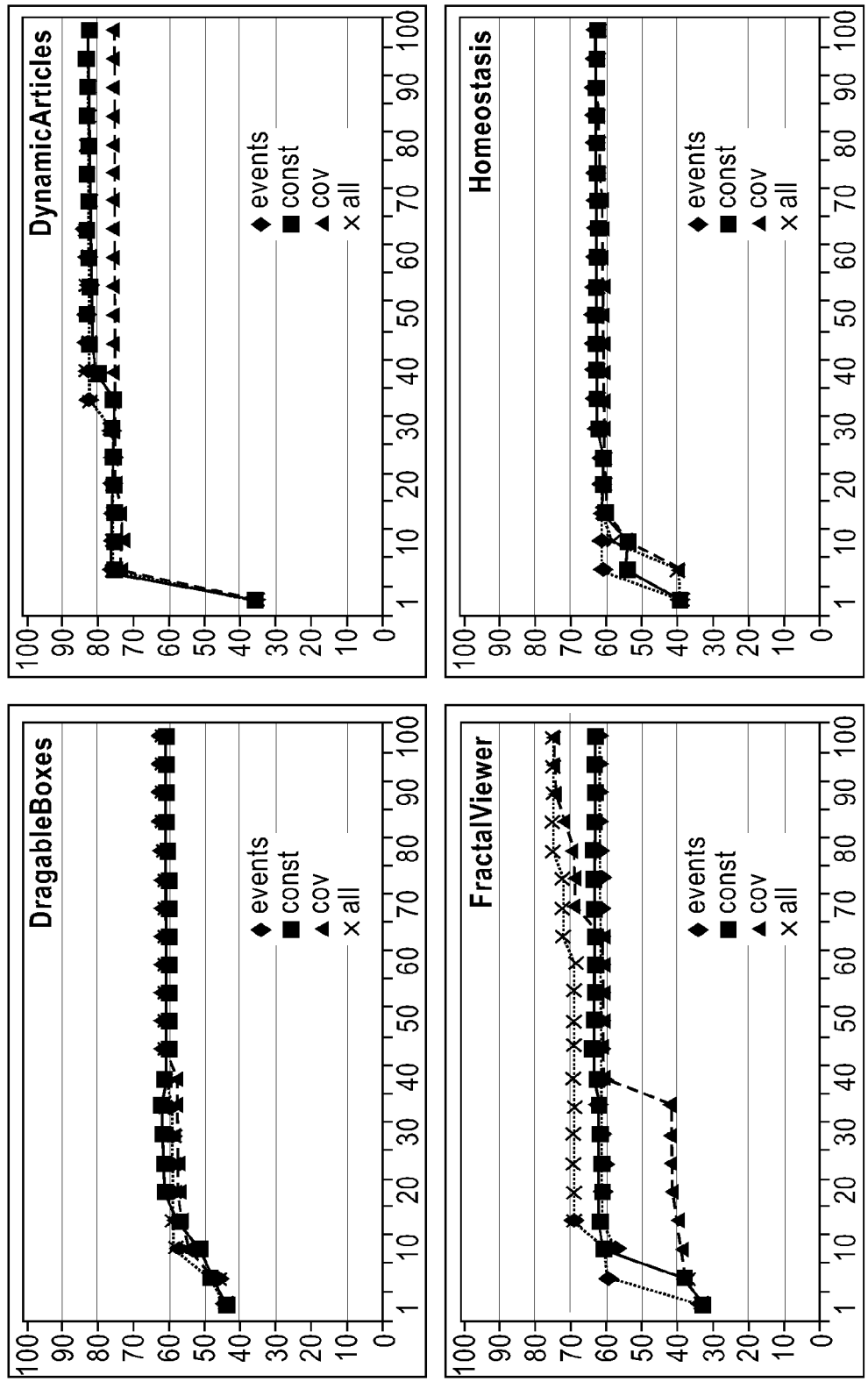
Figure 6C:
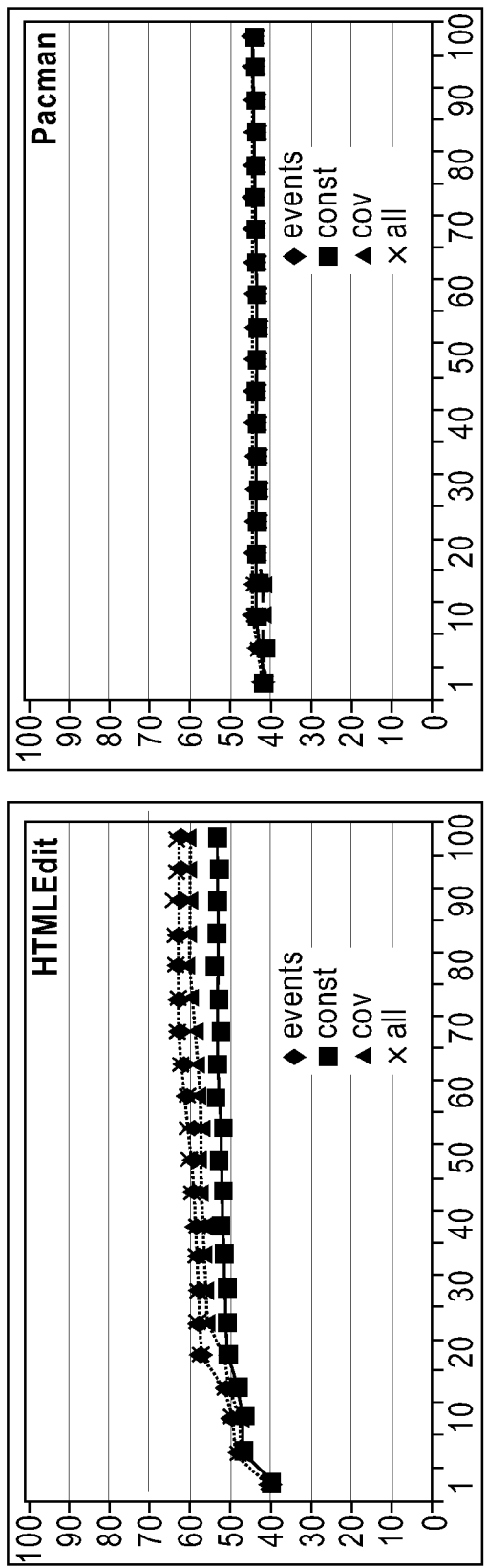

Turning to FIG. 6 shown is a series of graphs of coverage computed for each of the benchmarks, as a function of the number of generated tests. In summary, our conclusions of the experiments are:

Each of the events, const, cov, and all algorithms achieves significantly better coverage (69%, 69%, 71%, and 72%, on average) than initial (38% on average).

While the coverage achieved by events, const, cov, and all after generating 100 tests tends to be very similar, cov, and all converge on their result significantly faster in several cases.

The techniques find HTML validity errors in all benchmarks, but all and events find significantly more than initial. Only one execution error was found, and only the feedback-directed algorithms managed to find it.

5.9 Threats to Validity

There are several reasons why the presented results might not generalize. Our own most significant concern is that the selected benchmarks might not be representative of real-world JavaScript programs, because they are small, or because they lack a significant server-side component. With respect to representativeness, we are not aware of any bias in selecting these particular programs, some of which have been analyzed by other researchers as well. With respect to their sizes, it seems that the average JavaScript program is significantly smaller than the average Java or C program, and in our experience, the sizes of the applications that were analyzed, though small, are fairly typical of JavaScript programs without a significant server side.

6. Related Work

Our framework is related to the feedback-directed random testing technique by Pacheco et al. [19], implemented in the tool Randoop. In their approach, which targets object-oriented APIs and not JavaScript web applications, test inputs are sequences of method calls. Such test inputs are constructed, starting from the empty sequence, by extending an existing test input with a new method call using parameters obtained during previous calls. Instead of method call sequences, event sequences are considered as test inputs. A key difference is that their approach assumes a fixed collection of methods involved in the test inputs, whereas our technique in a feedback-directed manner needs to discover which events are relevant since event handlers can be added and removed during execution. Also, although random testing is the focus in this patent, our general framework does permit more general forms of feedback, such as combined concrete and symbolic execution [7,22,24], which are planned for future work.

Saxena et al. [22] present an automated approach for testing JavaScript applications, implemented in the tool Kudzu. It combines the use of random test generation to explore the application's event space (i.e., the possible sequences of user-interface actions) with the use of symbolic execution for systematically exploring an application's value space (i.e., how the execution of control flow paths depends on input values). The main goal of their work is to find code injection vulnerabilities that result from untrusted data provided as arguments to, for example, eval. The symbolic execution part relies on an elaborate model for reasoning about string values and string operations. In contrast, our framework does not divide the test input into an event space and a value space, and it permits random test generation and feedback-directed mechanisms to be combined less rigidly. In particular, our framework is feedback-directed also for the event space. Most importantly, although a direct comparison is not possible because of differences in experimental methodologies, as discussed in Section 5, our algorithms succeed in obtaining high code coverage without the use of a sophisticated string constraint solver. One consequence of the complexity of the approach by Saxena et al. can be seen in the experimental results reported in [22], which use a timeout of 6 hours. In contrast, we operate with much shorter test generation times of only a few minutes (see Section 5).

The Crawljax tool by Mesbah et al. [17] applies dynamic analysis to construct a state-flow graph that models the states of an AJAX application's user-interface and the transitions between these states. From this model, a set of equivalent static pages can be generated that can be used for various applications (e.g., applying search engines to their content, performing state-based testing, etc.). Crawljax relies on a heuristical approach for detecting "clickables", i.e., elements of the DOM that may correspond to active user-interface components, and crawls the application by exercising these clickables in some random order. In contrast, our technique monitors the code of an application as it executes and is capable of detecting when event handlers are registered. Crawljax does not require modifications to the JavaScript interpreter, but its heuristics-based approach may be unable to detect all event handlers (as is evidenced by the fact that the tool provides users with a domain-specific language to specify how to crawl an application) or recognize when event handlers are active. Furthermore, our feedback-directed technique is capable of exploring the state space of an application more effectively by detecting when sequences of events are likely to trigger interesting program behaviors. The approach by Duda et al. [5] also builds finite-state models of AJAX applications. It uses a fixed, breadth-first heuristic and is not feedback-directed. In later work, Mesbah and van Deursen describe Atusa [18], a tool that relies on Crawljax to create a model of the state space of an AJAX application. Then, Atusa can check this state space model for a number of common problems, including DOM invariants such as: situations where the application causes the HTML DOM to be malformed, situations where the DOM contains error messages such as "404 Not Found" and state machine invariants such as dead clickables (corresponding to URLs that are permanently unavailable) and situations where pressing the browser's back-button results in inconsistent behavior.

The event driven nature of JavaScript web applications is similar to traditional GUI applications, which also rely on user-triggered events to drive the program. Memon has described an approach to automated testing of GUI applications that consist of hierarchically organized modal dialogs [16]. In later work, Memon and Yuan employed execution feedback to enhance coverage by taking interactions between event handlers into account and refining test cases iteratively in batches [25, 26]. Although the underlying structure of the GUI application code is different compared to JavaScript applications, it may be possible to adapt their notion of event semantic interactions into our general framework, which we will explore in future work. This idea has also been used in a semi-automated approach to state-based testing by Marchetto et al. [14, 15].

Static analysis for JavaScript has emerged as a complementary technique for detecting errors [8, 9, 12], however this direction of work is still at an early stage. The dynamic nature of JavaScript [20], such as runtime code generation with eval and runtime HTML parsing with innerHTML, makes it difficult to create precise and scalable error detection tools based on static analysis alone. Yet another approach to finding errors in JavaScript applications is contract-driven testing [10], which, unlike our approach, requires the programmer to provide extensive formal contracts.

A central aspect of our framework is its ability to support many variations of prioritization and use of feedback. The topic of prioritization has been studied extensively for other domains than Java-Script, for example by Rothermel et al. [21] and Bryce and Memon [4]. Our read/write sets heuristic can be seen as a variant of the technique by Boonstoppel et al. [3].

7. Conclusion and Future Work

The main contribution of this patent is a framework for feedback-directed testing of JavaScript applications. We implemented the framework in a tool called Artemis and created several effective test generation algorithms by instantiating the framework with different prioritization functions and input generators that employ simple feedback mechanisms. Our experimental results show that the basic algorithm, events, produces surprisingly good coverage (69% on average) if enough tests are generated. However, if test generation is directed by coverage information and read-write sets, as embodied in our cov and all algorithms, a slightly better level of coverage (72% on average) can be achieved, and sometimes with many fewer tests. We have also demonstrated how the generated tests can be used for detecting programming errors, in particular HTML validity errors and crashes.

There are many possible avenues for future work, including other feedback-directed testing strategies, such as a suitable variation on symbolic execution [7, 24]. We are also interested in integrating Artemis with Apollo [2] to extend automated testing to applications that span both server and client code, and in generalizing the framework to accommodate for multiple concurrent users that interact via a shared server. Furthermore, the framework can provide a basis for studying fault localization techniques [1], test suite minimization [11], and detection of security vulnerabilities [8,9,22] for JavaScript applications. Our tool currently models only one particular browser, characterized by the Envjs library, when generating the test suite. However, the generated test suite can subsequently be run on other browsers as, e.g., Selenium scripts, in order to uncover browser incompatibilities. Alternatively, it may be worthwhile to modify or replace Envjs to model other browsers.

10. Information Processing System

Figure 7:
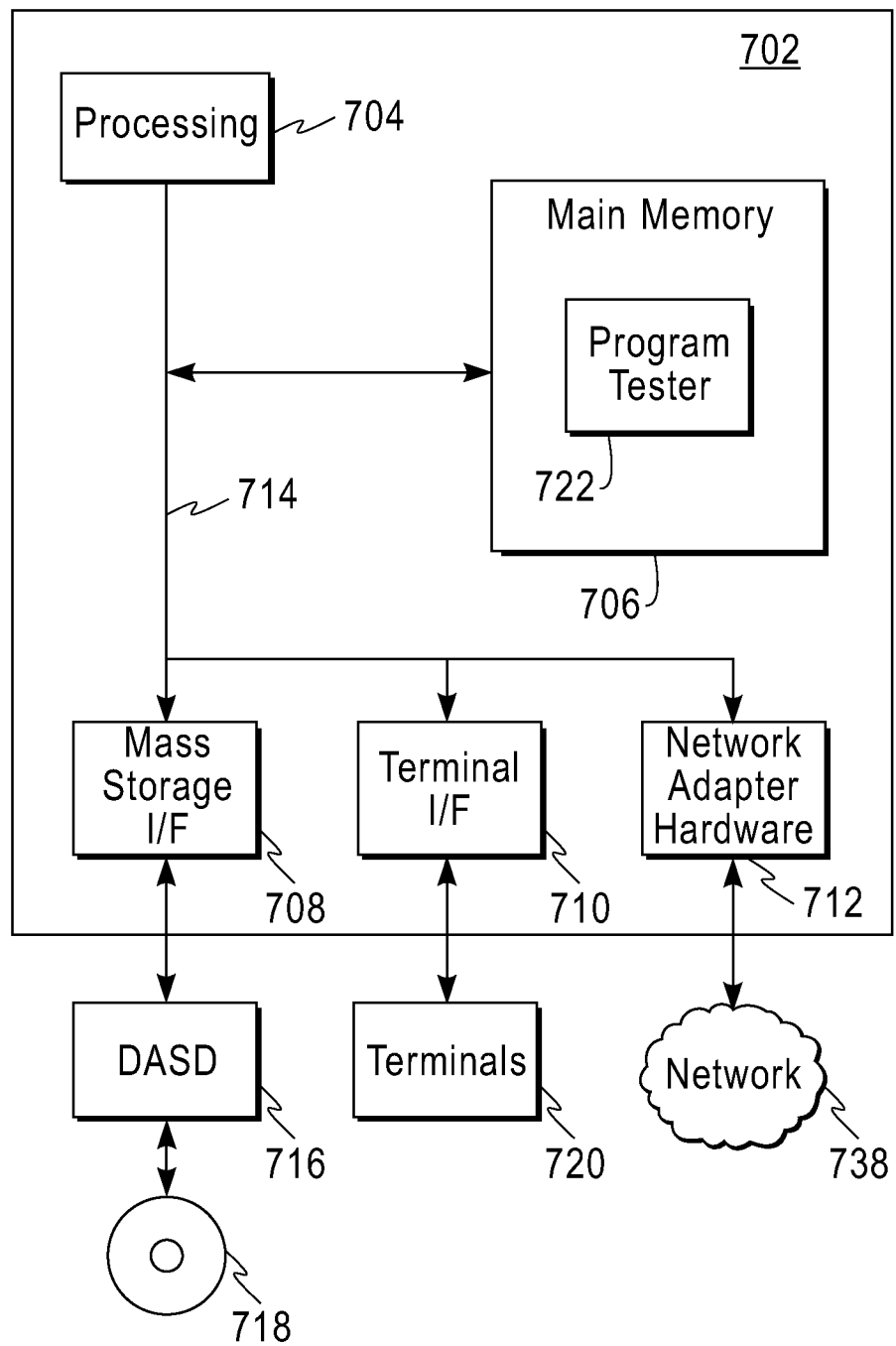
FIG. 7 is a block diagram illustrating a detailed view of an information processing system according to one example of the present invention.

Referring now to FIG. 7, this figure is a block diagram illustrating an information processing system that can be utilized in embodiments of the present invention. The information processing system 700 is based upon a suitably configured processing system adapted to implement one or more embodiments of the present invention (e.g., the user system 102 of FIG. 1). Any suitably configured processing system can be used as the information processing system 1600 in embodiments of the present invention.

The information processing system 700 includes a computer 702. The computer 702 has a processor(s) 704 that is connected to a main memory 706, mass storage interface 708, and network adapter hardware 710. A system bus 714 interconnects these system components. Although only one CPU 704 is illustrated for computer 702, computer systems with multiple CPUs can be used equally effectively. The main memory 706, in this embodiment, comprises the program tester tool 706 of the present invention.

The mass storage interface 708 is used to connect mass storage devices, such as mass storage device 714, to the information processing system 700. One specific type of data storage device is an optical drive such as a CD/DVD drive, which can be used to store data to and read data from a computer readable medium or storage product such as (but not limited to) a CD/DVD 716. Another type of data storage device is a data storage device configured to support, for example, NTFS type file system operations.

An operating system included in the main memory is a suitable multitasking operating system such as any of the Linux, UNIX, Windows, and Windows Server based operating systems. Embodiments of the present invention are also able to use any other suitable operating system. Some embodiments of the present invention utilize architectures, such as an object oriented framework mechanism, that allows instructions of the components of an operating system to be executed on any processor located within the information processing system 700. The network adapter hardware 710 is used to provide an interface to a network 718. Embodiments of the present invention are able to be adapted to work with any data communications connections including present day analog and/or digital techniques or via a future networking mechanism.

Non-Limiting Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

REFERENCES

Each of the twenty-six references are incorporated by reference in their entirety.

[1] S. Artzi, J. Dolby, F. Tip, and M. Pistoia. Practical fault localization for dynamic web applications. In Proc. 32nd Int. Conf. on Software Engineering, ICSE '10, May 2010.

[2] S. Artzi, A. Kiezun, J. Dolby, F. Tip, D. Dig, A. M. Paradkar, and M. D. Ernst. Finding bugs in dynamic web applications. In Proc. Int. Symp. on Software Testing and Analysis, ISSTA '08, July 2008.

[3] P. Boonstoppel, C. Cadar, and D. R. Engler. RWset: Attacking path explosion in constraint-based test generation. In Proc. 14th Int. Conf. on Tools and Algorithms for the Construction and Analysis of Systems, TACAS '08, March-April 2008.

[4] R. C. Bryce and A. M. Memon. Test suite prioritization by interaction coverage. In Proc. Workshop on Domain Specific Approaches to Software Test Automation, DOSTA '07, September 2007.

[5] C. Duda, G. Frey, D. Kossmann, R. Matter, and C. Zhou. AJAX crawl: Making AJAX applications searchable. In Proc. 25th Int. Conf. on Data Engineering, ICDE '09, March-April 2009.

[6] ECMA. ECMAScript Language Specification, 3rd edition. ECMA-262.

[7] P. Godefroid, N. Klarlund, and K. Sen. DART: Directed automated random testing. In Proc. ACM SIGPLAN Conf. on Programming Language Design and Implementation, PLDI '05, June 2005.

[8] S. Guarnieri and B. Livshits. Gatekeeper: Mostly static enforcement of security and reliability policies for JavaSc

[9] A. Guha, S. Krishnamurthi, and T. Jim. Using static analysis for Ajax intrusion detection. In Proc. 18th Int. Conf. on World Wide Web, WWW '09, April 2009.

[10] P. Heidegger and P. Thiemann JSConTest: Contract-driven testing of JavaScript code. In Proc. 48th Int. Conf. on Objects, Components, Models and Patterns, TOOLS '10, LNCS. Springer-Verlag, June-July 2010.

[11] H.-Y. Hsu and A. Orso. MINTS: A general framework and tool for supporting test-suite minimization. In Proc. 31st Int. Conf. on Software Engineering, ICSE '09, May 2009.

[12] S. H. Jensen, A. Moller, and P. Thiemann Type analysis for JavaScript. In Proc. 16th Int. Static Analysis Symposium, SAS '09, volume 5673 of LNCS. Springer-Verlag, August 2009.

[13] A. Le Hors et al. Document Object Model (DOM) level 3 core specification, April 2004. W3C Recommendation. http://www.w3.org/TR/DOM-Level-3-Core/.

[14] A. Marchetto and P. Tonella. Search-based testing of Ajax web applications. In Proc. 1st Int. Symp. on Search Based Software Engineering, SSBSE '09, May 2009.

[15] A. Marchetto, P. Tonella, and F. Ricca. State-based testing of Ajax web applications. In Proc. 1st Int. Conf. on Software Testing, Verification, and Validation, ICST '08, April 2008.

[16] A. M. Memon. An event-flow model of GUI-based applications for testing. Software Testing, Verification & Reliability, 17(3):137-157, 2007.

[17] A. Mesbah, E. Bozdag, and A. van Deursen. Crawling AJAX by inferring user interface state changes. In Proc. 8th Int. Conf. on Web Engineering, ICWE '08, July 2008.

[18] A. Mesbah and A. van Deursen. Invariant-based automatic testing of AJAX user interfaces. In Proc. 31st Int. Conf. on Software Engineering, ICSE '09, May 2009.ript code. In Proc. 18th USENIX Security Symposium, August 2009.

[19] C. Pacheco, S. K. Lahiri, M. D. Ernst, and T. Ball. Feedback-directed random test generation. In Proc. 29th Int. Conf. on Software Engineering, ICSE '07, May 2007.

[20] G. Richards, S. Lebresne, B. Burg, and J. Vitek. An analysis of the dynamic behavior of JavaScript programs.

In Proc. ACM SIGPLAN Conf. on Programming Language Design and Implementation, PLDI '10, June 2010.

[21] G. Rothermel, R. H. Untch, C. Chu, and M. J. Harrold. Prioritizing test cases for regression testing. IEEE Trans. On Software Engineering, 27(10):929-948, 2001.

[22] P. Saxena, D. Akhawe, S. Hanna, S. McCamant, D. Song, and F. Mao. A symbolic execution framework for JavaScript. In Proc. 31st IEEE Symp. on Security and Privacy, S&P '10, May 2010.

[23] D. Schepers et al. Document Object Model (DOM) level 3 events specification, September 2009. W3C Working Draft. http://www.w3.org/TR/DOM-Level-3-Events/.

[24] K. Sen, D. Marinov, and G. Agha. CUTE: a concolic unit testing engine for C. In Proc. 10th European Software Engineering Conf. held jointly with 13th ACM SIGSOFT Int. Symp. on Foundations of Software Engineering, ESEC/FSE '05, September 2005.

[25] X. Yuan and A. M. Memon. Generating event sequence-based test cases using GUI runtime state feedback. IEEE Trans. on Software Engineering, 36(1):81-95, 2010.

[26] X. Yuan and A. M. Memon. Iterative execution-feedback model-directed GUI testing. Information & Software Technology, 52(5):559-575, 2010.

[27] S. Artzi, J. Dolby, S, Jensen, Anders Moller, and F. Tip. A Framework for Automated Testing of JavaScript Web Applications. ICSE '11 May 21-28, 2011, Honolulu, Hi., USA.

What is claimed is:

1. A computer-implemented method for automated testing of programs, the method comprising:
   accessing at least a portion of a program with an event-based interface;
   placing an arbitrary state in a set of test inputs;
   performing each of the following until at least one of i) a testing time allocated has expired, and ii) every test input in the set of test inputs has been executed:
      selecting at least one test input with an associated event handler from the set of test inputs;
      creating a set of branch points corresponding to the associate event handler, wherein each branch point is at least one of an entry to the associated event handler and a location in the program from which control flows in response to actions initiated outside the program;
      loading the test input to set a state of the program;
      executing the test input and the associated event handler to produce a resulting state;
      updating a set of results with the test input that was executed and a description of any errors encountered during execution of the test input; and
      based on the branch point being found in the set of branch points for the test input reducing a priority the test input in the set of test inputs, otherwise based on the resulting state being found in the set of results for the test input, updating the set of test inputs by at least one of:
         updating a parameter used in the test input;
         adding a new event in the event-based interface to be used with the test input; and
         updating the resulting state in the set of test inputs.

2. The computer-implemented method of claim 1, wherein the updating the set of results with the test input that was executed further includes at least one of preventing an extension of event sequences that lead to runtime errors and changes to a page Uniform Resource Locator (URL).

3. The computer-implemented method of claim 1, wherein the set of test inputs are reprioritized based on the set of branch points using a prioritized function:

$$P(c) = 1 - \text{cov}(e_1) \times \ldots \times \text{cov}(e_n)$$

for a set of event handlers e, use cov(e) to denote a number of branch points that have been executed in e divided by a total number of branches that have been discovered so far in e, where c is the new event to be used with the test input.

4. The computer-implemented method of claim 1, wherein the set of test inputs are reprioritized based a program state read and written by the associated event handler.

5. The computer-implemented method of claim 4, wherein the set of test inputs are reprioritized based on a program state read and written by the associate event handler using a prioritized function:

$$P(c) = \frac{|(\text{written}(e_1) \cup \ldots \cup \text{written}(e_{n-1}) \cap \text{read}(e_n)| + 1}{|\text{read}(e_n)| + 1}$$

for each event handler in a set of event handlers e, a set of read(e) and written(e) of names of variables and properties to be read and written, respectively, during executions of an event handler from the set of event handlers e.

6. The computer-implemented method of claim 1, wherein the program is a web page for execution in a browser, and the arbitrary state is a starting web page, and the placing the arbitrary state in the set of test inputs including placing the arbitrary state.

7. The computer-implemented method of claim 6, wherein the arbitrary state is prioritized based on a document object model associated with the starting web page.

8. The computer-implemented method of claim 7, wherein accessing the web page including a portion written with a scripting language.

9. The computer-implemented method of claim 8, wherein the scripting language includes a portion written in JavaScript.

10. The computer-implemented method of claim 1, wherein the set of results includes one or more web pages, and where a static analysis is applied to those web pages to find security vulnerabilities, which are then reported to a user.

11. A computer-implemented method for automated testing of applications, the method comprising:
   accessing, in a browser, an initial web page including a portion written with a scripting language;
   placing an arbitrary initial browser state in a set of test inputs that have been prioritized based on a document object model associated with the initial web page;
   performing each of the following until at least one of i) a testing time allocated has expired, and ii) every test input in the set of test inputs has been executed:
      selecting at least one test input with an associated event handler from the set of test inputs;
      creating a set of branch points corresponding to the associate event handler, wherein each branch point is at least one of an entry to the associated event handler and a location in the program from which control flows in response to actions initiated outside the program;
      loading the test input to set a state of the browser;
      executing the test input and the associated event to produce a resulting state;

updating a set of results with the test input that was executed and a description of any errors encountered during execution of the test input; and based on the branch point being found in the set of branch points for the test input reducing a priority the test input in the set of test inputs, otherwise based on the resulting state being found in the set of results for the test input, updating the set of test inputs by at least one of:

updating a parameter used in the test input;
adding a new event to be used with the test input; and
updating the resulting state in the browser.

12. A computer program product for automated testing of programs comprising a non-transitory computer readable storage medium having computer readable program code embodied therewith, the computer readable program code comprising computer readable program code configured to:

accessing at least a portion of a program with an event-based interface;

placing an arbitrary state in a set of test inputs;

performing each of the following until at least one of i) a testing time allocated has expired, and ii) every test input in the set of test inputs has been executed:

selecting at least one test input with an associated event handler from the set of test inputs;

creating a set of branch points corresponding to the associate event handler, wherein each branch point is at least one of an entry to the associated event handler and a location in the program from which control flows in response to actions initiated outside the program;

loading the test input to set a state of the program;

executing the test input and the associated event handler to produce a resulting state;

updating a set of results with the test input that was executed and a description of any errors encountered during execution of the test input; and based on the branch point being found in the set of branch points for the test input reducing a priority the test input in the set of test inputs, otherwise based on the resulting state being found in the set of results for the test input, updating the set of test inputs by at least one of:

updating a parameter used in the test input;
adding a new event in the event-based interface to be used with the test input; and
updating the resulting state in the set of test inputs.

13. The computer program product of claim 12, wherein the updating the set of results with the test input that was executed further includes at least one of preventing an extension of event sequences that lead to runtime errors and changes to a page URL.

14. The computer program product of claim 13, wherein the set of test inputs are reprioritized based on the set of branch points using a prioritized function:

$$P(c) = 1 - \text{cov}(e_1) \times \ldots \times \text{cov}(e_n)$$

for a set of event handlers e, use cov(e) to denote a number of branch points that have been executed in e divided by a total number of branches that have been discovered so far in e, where c is the new event to be used with the test input.

15. The computer program product of claim 12, wherein the set of test inputs are reprioritized based a program state read and written by the associated event handler.

16. The computer program product of claim 15, wherein the set of test inputs are reprioritized based on a program state read and written by the associate event handler using a prioritized function:

$$P(c) = \frac{|(\text{written}(e_1) \cup \ldots \cup \text{written}(e_{n-1})) \cap \text{read}(e_n)| + 1}{|\text{read}(e_n)| + 1}$$

for each event handler in a set of event handlers e, a set of read(e) and written(e) of names of variables and properties to be read and written, respectively, during executions of an event handler from the set of event handlers e.

17. The computer program product of claim 12, wherein the program is a web page for execution in a browser, and the arbitrary state is a starting web page, and the placing the arbitrary state in the set of test inputs including placing the arbitrary state.

18. The computer program product of claim 17, wherein the arbitrary state is prioritized based on a document object model associated with the starting web page.

19. The computer program product of claim 18, wherein accessing the web page including a portion written with a scripting language.

20. The computer program product of claim 19, wherein the scripting language includes a portion written in JavaScript.

21. The computer program product of claim 12, wherein the set of results includes one or more web pages, and where a static analysis is applied to those web pages to find security vulnerabilities, which are then reported to a user.

22. A system for automated testing of programs transforming comprising:

memory;

at least one processor communicatively coupled to the memory configured for:

accessing at least a portion of a program with an event-based interface;

placing an arbitrary state in a set of test inputs;

performing each of the following until at least one of i) a testing time allocated has expired, and ii) every test input in the set of test inputs has been executed:

selecting at least one test input with an associated event handler from the set of test inputs;

creating a set of branch points corresponding to the associate event handler, wherein each branch point is at least one of an entry to the associated event handler and a location in the program from which control flows in response to actions initiated outside the program;

loading the test input to set a state of the program;

executing the test input and the associated event handler to produce a resulting state;

updating a set of results with the test input that was executed and a description of any errors encountered during execution of the test input; and based on the branch point being found in the set of branch points for the test input reducing a priority the test input in the set of test inputs, otherwise based on the resulting state being found in the set of results for the test input, updating the set of test inputs by at least one of:

updating a parameter used in the test input;
adding a new event in the event-based interface to be used with the test input; and
updating the state in the set of test inputs.

23. The system of claim 22, wherein the updating a set of results with the test input that was executed includes at least one of preventing an extension of event sequences that lead to runtime errors and changes to a page URL.

\* \* \* \* \*